United States Patent
Griffin

(10) Patent No.: US 6,820,888 B1
(45) Date of Patent: Nov. 23, 2004

(54) ALIGNMENT GUIDE FOR A TRAILER HITCH

(76) Inventor: Larry W. Griffin, 815 Tanglewood E., Irving, TX (US) 75061

( * ) Notice: Subject to any disclaimer, the term of this patent is extended or adjusted under 35 U.S.C. 154(b) by 0 days.

(21) Appl. No.: 10/360,272

(22) Filed: Feb. 7, 2003

Related U.S. Application Data

(60) Provisional application No. 60/355,084, filed on Feb. 11, 2002.

(51) Int. Cl.$^7$ ................................................. B60D 1/40
(52) U.S. Cl. ...................................... 280/477; 116/28 R
(58) Field of Search ................................ 280/477, 495, 280/504, 508, 511; 33/264; 116/28 R; 403/282, 315–317, 319, 326, 329, 404, 179; 411/533, 149, 150, 136; 464/46–48; 451/509

(56) References Cited

U.S. PATENT DOCUMENTS

| | | | | |
|---|---|---|---|---|
| 3,159,917 A | * | 12/1964 | Whitehead | 33/264 |
| 3,702,029 A | * | 11/1972 | Anderson, Jr. | 33/264 |
| 3,889,384 A | * | 6/1975 | White | 33/264 |
| 3,918,746 A | * | 11/1975 | Lehtisaari | 280/477 |
| 4,012,056 A | | 3/1977 | Christensen | |
| 4,054,302 A | | 10/1977 | Campbell | |
| 4,560,183 A | | 12/1985 | Cook | |
| 4,583,481 A | * | 4/1986 | Garrison | 116/28 R |
| 4,627,634 A | * | 12/1986 | Coleman | 280/477 |
| 5,036,593 A | | 8/1991 | Collier | |
| 5,113,588 A | * | 5/1992 | Walston | 33/264 |
| 5,288,096 A | | 2/1994 | Degelman | |
| 5,309,289 A | | 5/1994 | Johnson | |
| 5,328,199 A | | 7/1994 | Howe | |
| 5,669,621 A | | 9/1997 | Lockwood | |
| 5,680,706 A | | 10/1997 | Talcott | |
| 5,755,453 A | | 5/1998 | Bell | |
| 6,042,136 A | * | 3/2000 | Heinecke | 280/477 |
| 6,234,510 B1 | | 5/2001 | Hammons | |
| 6,341,794 B1 | * | 1/2002 | Hunter | 280/477 |
| 6,540,247 B1 | * | 4/2003 | Perkins | 280/477 |

* cited by examiner

Primary Examiner—Lesley D. Morris
Assistant Examiner—Matthew Luby
(74) Attorney, Agent, or Firm—George L. Williamson

(57) ABSTRACT

The present invention discloses an alignment guide for trailer hitches for a person backing a vehicle having thereon a trailer hitch ball into proper alignment with the tongue and trailer hitch socket of a trailer. The present invention comprises a telescopic guide post for attachment onto the top of the hitch socket on the tongue of the trailer. A receiver, having a mounting base and a "Y" member, is provided for magnetic attachment to the rear of the backing vehicle. The base of the "Y" of the receiver member contacts the telescopic upright member to inform the driver of the vehicle that the ball of the hitch is directly under the socket on the tongue of the trailer.

14 Claims, 2 Drawing Sheets

ALIGNMENT GUIDE FOR A TRAILER HITCH

This application claims benefit of U.S. Provisional Application Ser. No. 60/355,084 filed on Feb. 11, 2002.

BACKGROUND OF THE INVENTION

1. Field of the Invention

The present invention generally relates to trailer hitches, and, more particularly, is concerned with an alignment guide for a trailer hitch.

2. Description of the Prior Art

Trailer hitch guides have been described in the prior art. However, none of the prior art devices disclose the unique features of the present invention.

In U.S. Pat. No. 4,560,183, dated Dec. 24, 1985, Cook disclosed a trailer hitch guide constructed in accordance with the present invention mounting a base upon the vehicle hitch and a pair of detachably, mountable, lateral guides are attachable to the base for projecting rearwardly therefrom. A first cam surface is provided which is connectable to said base and a second cam surface is connectable to the trailer tongue. The first and second cam surfaces are formed to cooperate to cause relative vertical displacement between the vehicle hitch and the trailer tongue as the vehicle hitch approaches the trailer tongue. The trailer tongue is aligned in a horizontal plane and raised in a vertical plane during the approach until the socket on the trailer tongue is positioned over the ball hitch. The trailer tongue is then dropped upon the ball hitch engaging the socket over the ball. The lateral guides and cam surface are removable as necessary to facilitate freedom of angular movement between the trailer hitch and the trailer tongue.

In U.S. Pat. No. 5,288,096, dated Feb. 22, 1994, Degelman disclosed a self aligning hitching device having a tongue support mountable on a vehicle or vehicle hitch. The tongue support has a mounting support so that the tongue support can easily be mounted on a vehicle. A tongue is provided that is mounted in the tongue support and is slideably free floating when in the locked position. It is at this time the connection is made between the towed and towing vehicles. Both the tongue and tongue support have wedging surfaces that guide the tongue now connected to a wedged or fully seated position at which time a spring biased locking pin secures them both together so that a towing vehicle carrying the tongue support and a towed vehicle connected to the tongue are now joined and ready for towing movement.

In U.S. Pat. No. 6,234,510B1, dated May 22, 2001, Hammons disclosed a trailer hitch guide including a V-shaped fence removably attached to a base plate, the base plate being attached to a tow bar by a ball hitch. The V-shaped fence formed by a pair of plates defining a dihedral angle. The fence is temporarily and removably attached to the base plate by a pair of studs extending from the bottom edge of the fence plates. The base plate has a pair of elongated cylindrical tubes which define sockets into which the fence studs may be inserted. In a first embodiment, the base plate has a U-shaped member attached to the sides of the base plate with the crossbar in a plane vertically below the base plate, defining a rectangular collar in conjunction with the base plate having a perimeter slightly larger than the tow bar so that the collar slides over and encircles the tow bar. The elongated cylindrical tubes are attached to the sides of the U-shaped member. The collar prevents the guide from yawing around the base plate or rocking forwards and backwards as the socket on the trailer tongue pushes against the fence. In a second embodiment, the base plate is a flat plate having a notch defined in its back edge adapted for receiving the trailer hitch, the two elongated tubes depending from the bottom surface of the base plate. The fence is removed from the base plate after connection of the trailer hitch to allow unrestricted rotation of the hitch.

In U.S. Pat. No. 5,755,453, dated May 26, 1998, Bell disclosed an apparatus for use with a boat or similar type trailer comprising a bracket with a forwardly extending portion and a rearwardly extending portion securable to the framework of a trailer adjacent to the rear. A pivot pin is provided and has a fixed end secured to the bracket. A resilient C-shaped clip with a central extent and a front opening is secured to the forwardly extending portion of the bracket. Another resilient C-shaped clip with a central extent and a front opening is secured to the rearwardly extending portion of the bracket. A rigidly elongated tube is provided and has an aperture adjacent to its lower end pivotally received on the pin and adapted to be moved from a lower horizontal orientation to a raised vertical orientation. The pole is adapted to be received within the clip in either orientation and retained in such orientation until pulled upwardly by an external force applied as by a user, or pushed downwardly as by an external force applied as by boat or similar device.

In U.S. Pat. No. 5,309,289, dated May 3, 1994, Johnson disclosed an optical targeting system for facilitating a vehicle operator's effecting alignment of the respective hitch assembly components of a towing vehicle and a towed vehicle. The system includes first and second targets that are removably positionable in referencing relationship to respective ones of the hitch assembly components and a viewing mirror that is removably positionable on the towed vehicle to provide the vehicle operator positioned in the towing vehicle with a reflected view of the two targets. Each of the two targets include a longitudinal guidance element that is disposed in alignment with the longitudinal axis of its respective vehicle and a transverse guidance element that is transversely oriented to the respective longitudinal guidance element and located above the hitch assembly component to provide a visual reference to a vertical axis extending through those components.

In U.S. Pat. No. 4,054,302, dated Oct. 18, 1977, Campbell disclosed a trailer hitch guide intended for use in assisting the driver of an automotive vehicle to align, for hitching purposes, a trailer hitch ball, of the type conventionally carried by an automobile or other automotive hauling vehicle, with a trailer hitch socket, of the type conventionally carried on the tongue of a trailer, the guide being comprised of a pair of identical, highly visible and electrically lightable guide members, one of the guide members being adapted to be temporarily attached to the trailer tongue while the other guide member is adapted to be temporarily attached to the rear of the hauling vehicle whereby both guide members are highly visible through the rear window of the vehicle, during dim lighting conditions and at night as well as during daylight hours, to a vehicle driver seated in the driver's seat during the aligning operation.

In U.S. Pat. No. 4,012,056, dated Mar. 15, 1977, Christensen disclosed a visual guide device for hitching vehicles. A guide device assists the driver of a towing vehicle in properly positioning the hitch ball located on same for connection with the hitch socket of a trailer. A cover is closely fit over the hitch ball to mount a telescoping sight arm thereto. A compressible ball is tightly inserted in the socket to mount a second telescoping sight arm to the trailer hitch. The sight arms provide guides which enable the driver to accurately back a towing vehicle toward the trailer for connection of the cooperating hitch portions.

In U.S. Pat. No. 5,328,199, dated Jul. 12, 1994, Howe disclosed a vehicle alignment assistance device which enables a towing vehicle to be aligned with a trailer in such a manner that the towing ball at the rear of the vehicle will be vertically aligned with the towing socket attached to the trailer. A visible target is located at the forward end of an extendable rod located within a box to be attached to the front end of the trailer. A sighting mark is located on the rear window of the towing vehicle. When the target-carrying member (rod) is extended from the box so that the target is in contact with the sighting mark on the towing vehicle, the towing socket will be vertically aligned with the towing ball. A driver of the vehicle backs the vehicle toward the trailer until the target carried at the end of the extended rod touches the sighting mark on the rear window. The rod can be pivotally mounted in the box, which can provide a waterproof storage for the rod when not in use as an alignment aid.

In U.S. Pat. No. 5,669,621, dated Sep. 23, 1997, Lockwood disclosed a device for facilitating the alignment of a trailer hitch socket with the ball mounted on the towing vehicle composed of a fixed sight member, a pivoting sight member, and a stop plate. The pivoting sight member mounts on the edges of the trailer tongue and extends vertically upward to the point which it is visible from the towing vehicle. The fixed sight member is magnetically attached to the towing vehicle and mounted adjacent to the towing ball on the trailer hitch. The fixed sight member extends vertically upward to a height at which it is visible from within the towing vehicle. As the vehicle backs up toward the trailer, the driver can see the two sight members and steer such that they will come closer and closer together. When the socket is directly over the ball the pivoting sight member is actuated and signals the driver that the alignment is achieved. The stop brace prevents the towing vehicle from colliding with the trailer hitch.

In U.S. Pat. No. 5,036,593, dated Aug. 6, 1991, Collier disclosed a unitary trailer alignment guide for positioning a towing vehicle with respect to a trailer for connecting a trailer hitch, including a base, a telescoping upright member, a telescoping horizontal member joined at one end of the upright member and rotatable through 270 degrees at the joint, and a vertical member at the forward end of the horizontal member, remote from the joint. In use, a trailer guide is mounted on a trailer. The lengths of the telescoping vertical and horizontal member will touch the towing vehicle when the trailer is aligned with the towing vehicle in position for connecting the trailer hitch.

In U.S. Pat. No. 5,680,706, dated Oct. 28, 1997, Talcott disclosed a device for alignment of a trailer and a towing vehicle which consists of a visible mast placed on the trailer tongue to allow the towing vehicle driver to view the mast and to easily back into a correct position for coupling with the trailer. The mast has a pivotable arm which can be secured either in an extended contact position or a relaxed, downward position as necessary.

While these trailer hitch guides may be suitable for the purposes for which they were designed, they would not be as suitable for the purposes of the present invention, as hereinafter described.

SUMMARY OF THE INVENTION

The present invention discloses an alignment guide for trailer hitches to provide a means for a person backing a vehicle having thereon a trailer hitch ball into proper alignment with the tongue and trailer hitch socket of a trailer. The present invention comprises a telescopic guide post for attachment onto the top of the hitch socket on the tongue of the trailer. A receiver, having a mounting base and a "Y" member, is provided for magnetic attachment to the rear of the backing vehicle. The base of the "Y" of the receiver member contacts the telescopic upright member to inform the driver of the vehicle that the ball of the hitch is directly under the hitch socket on the tongue of the trailer.

The object of the present invention is to allow the driver of a vehicle to easily connect to the trailer hitch of a trailer. A further objective is to provide an alignment guide that is easy to operate. A further objective of the present invention is to provide an alignment guide which is light and portable, and relatively inexpensive to manufacture.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is defined by the appended claims.

BRIEF DESCRIPTION OF THE DRAWINGS

In order that the invention may be more fully understood, it will now be described, by way of example, with reference to the accompanying drawings in which.

List of Reference Numerals

Figure 1:
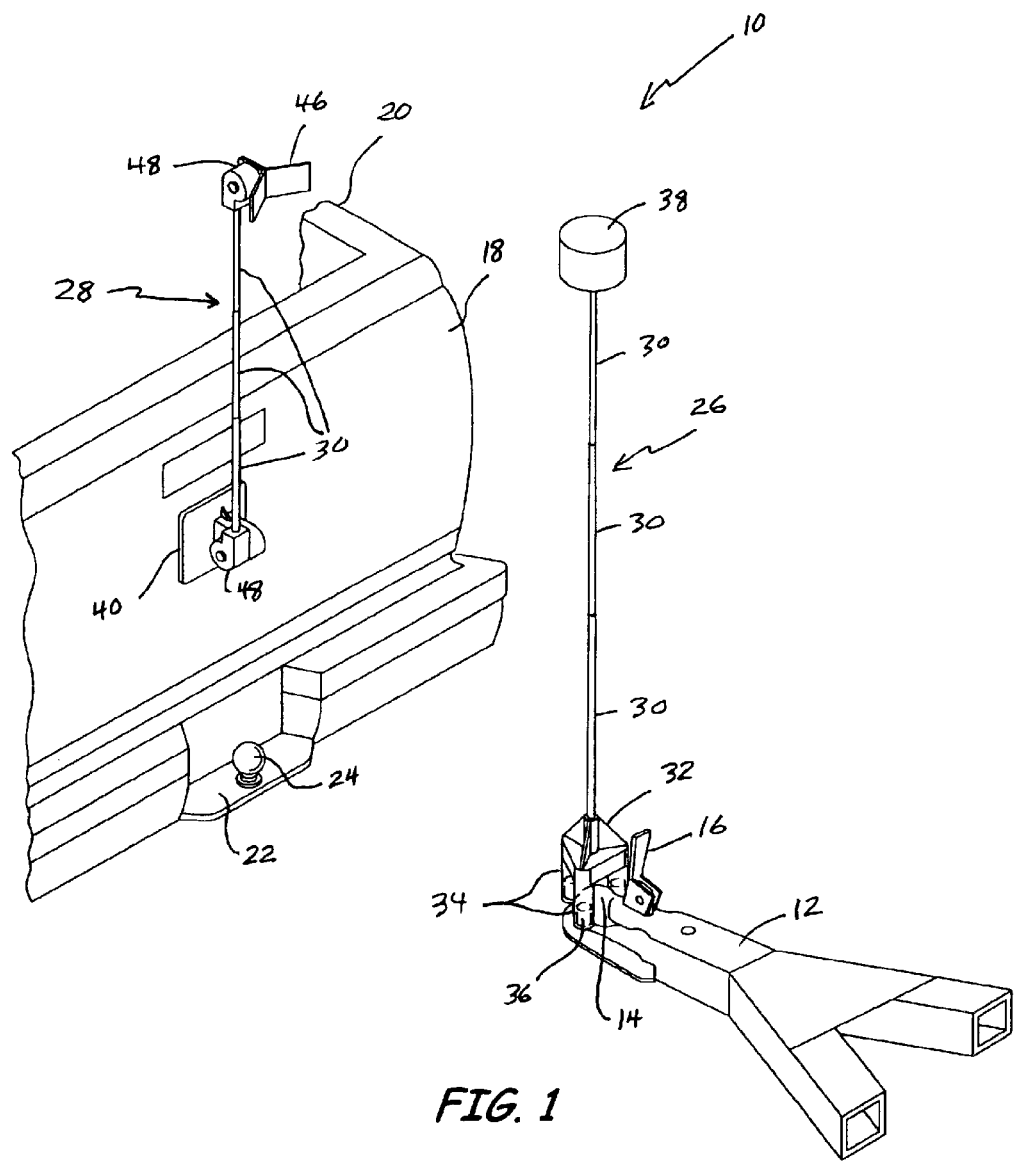
FIG. 1 is a respective view of the present invention.

With regard to reference numerals used, the following numbering is used throughout the drawings.
10 present invention
12 trailer tongue
14 trailer hitch socket
16 lock means for trailer hitch socket
18 back of vehicle
20 vehicle
22 trailer hitch
24 trailer hitch ball
26 guide post member
28 receiver member
30 telescoping segments
32 base
34 legs
36 magnet
38 cap
40 base
42 threaded fastener
44 wing nut
46 "Y" element
48 pivot means
50 base of "Y"
52 leg 54 arms
56 phosphorescence
58 light emitting diode

DESCRIPTION OF THE PREFERRED EMBODIMENT(S)

Figure 2:
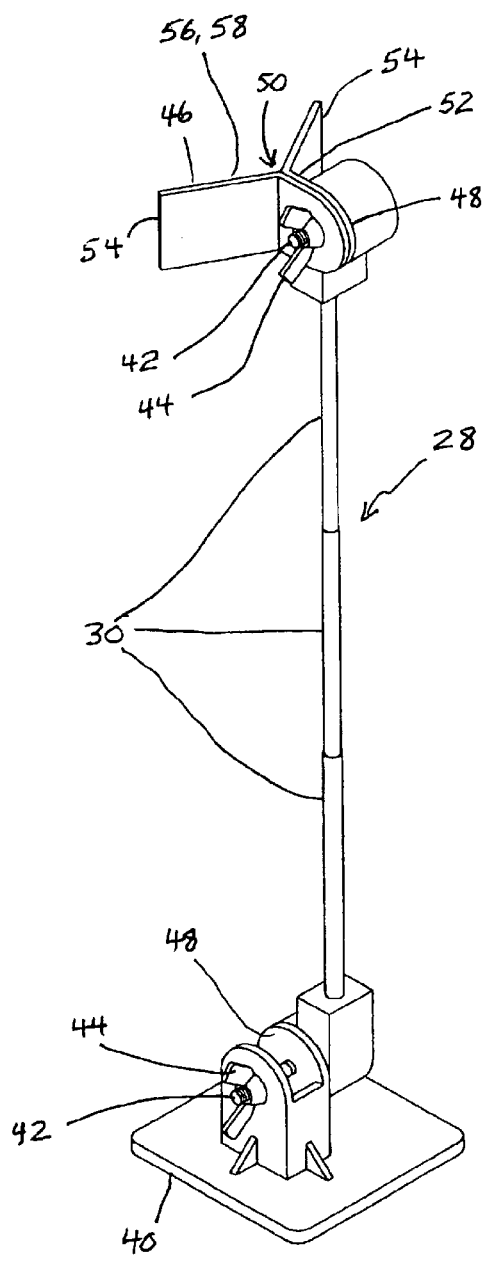
FIG. 2 is a respective view of parts of the present invention.
Figure 3:
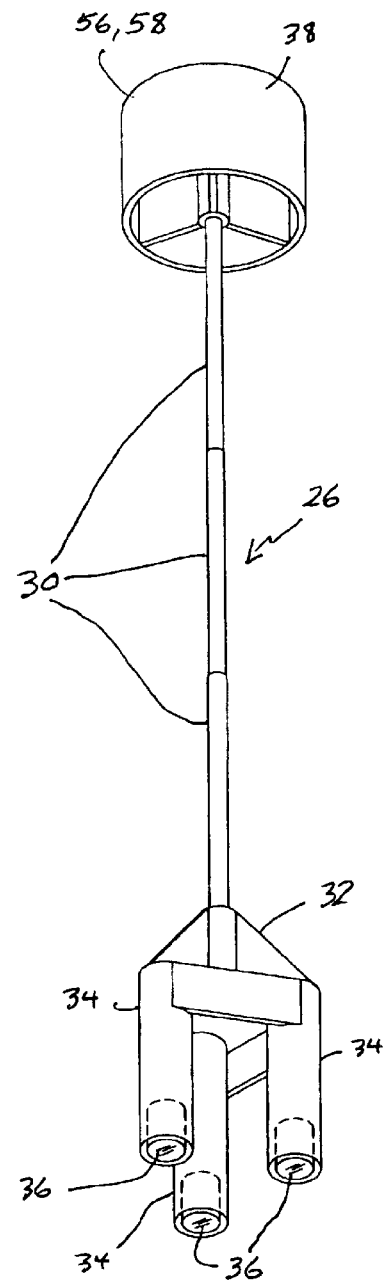
FIG. 3 is a respective view of parts of the present invention.

In order that the invention may be more fully understood, it will now be described, by way of example, with reference to the accompanying drawings in which FIGS. 1 through 3 illustrate the present invention wherein an alignment guide for a trailer hitch is disclosed.

Turning to FIG. 1, therein is shown a perspective view of the present invention 10. Shown is the tongue 12 of a trailer having the trailer hitch socket 14 thereon, along with a conventional locking means 16 disposed on the top of the hitch socket element on the tongue of the trailer. Also shown is the surface of the back side or end 18 of the vehicle 20 having mounted thereon the trailer hitch 22 and the ball 24. The purpose of the present invention 10 is to allow the trailer hitch ball 24 to be aligned with the hitch socket 14 on the tongue of the trailer hitch. Shown are the telescoping guide post member 26 along with the telescoping receiver member 28. The telescoping guide post member 26 mounts onto the top of the hitch socket 14 of the trailer tongue 12 and the receiver member 28 mounts onto the back 18 of the vehicle 20. The upright standing guidepost 26 has a plurality of telescoping sections 30 which are mounted onto a triangular-like base 32 having a plurality of legs 34 thereon, which legs each have a magnet disposed on its bottom at 36 for making contact with the upper portion of the hitch socket 14 of the trailer. The receiver member 28 also has a plurality of telescoping members 30. The guidepost 26 also has disposed on its upper segment a guide cap 38 which is easily visible to the driver of the vehicle 20. The receiver element 28 has a magnetic base 40 having disposed thereon a "Y" shaped element 46. Multiple pivoting means 48 are provided between the base 40 and the lower end of the receiver member 28 and between the upper end of the receiver member 28 and the "Y" element 46. It can be seen that the base 40 mounts onto the back 18 of the vehicle. Means for phosphorescence 56, e.g., paint, may be disposed on the surface of the cap 38 and "Y" member 46 to aid the driver of the vehicle in aligning the trailer and vehicle during darkness. Also, a light emitting diode 58 may be disposed on the cap 38 and "Y" member 46 to aid the driver of the vehicle in aligning the trailer and vehicle during darkness.

Turning to FIG. 2, therein is shown the telescoping receiver element 28 having multiple segments 30 having disposed thereon the magnetic base 40, and "Y" member 46. The multiple pivoting means 48 are also shown disposed thereon. The guidepost cap (Item 38 of FIGS. 1 and 3) fits into the base 50 of the "Y" 46 during the procedure of attaching the trailer to the vehicle so as to notify the driver that the trailer hitch socket and the trailer hitch ball are in proper alignment for proper connection. The "Y" 46 has a leg 52 and a pair of arms 54 thereon. Note that the pivoting means 48 attached to the upper and lower ends of receiver member 28 allows the "Y" member 46 to be adjusted in both the vertical and horizontal planes relative to the vehicle 20 and trailer hitch ball 24. The pivot means 48 each have a threaded fastener 42 having a mating threaded wing nut 44 disposed thereon for frictionally tightening the pivot means 48.

Turning to FIG. 3, therein is shown the guidepost 26 which has been previously explained. The elements shown are the hollow cap 38, multiple segments 30, base 32, legs 34, and magnets 36. It can be seen that the magnets 36 are disposed in a recess located in the lower end of each leg 34.

What is claimed is:

1. A combination vehicle, trailer and alignment guide to aid the driver of a vehicle while maneuvering the vehicle in relation to a trailer during the procedure of attaching the trailer to the vehicle, comprising:

a) a vehicle for towing the trailer, a rear end disposed on said vehicle, a surface disposed on said rear end to which a part of the alignment guide is attached, a trailer hitch disposed on said rear end, a trailer hitch ball disposed on said trailer hitch to which ball the trailer is attached;

b) a trailer having a hitch tongue disposed thereon, a trailer hitch socket disposed on said trailer hitch tongue for receiving said trailer hitch ball therein; said trailer hitch socket having a top, and a lock disposed on said trailer hitch socket to permit the trailer to be secured to the trailer hitch ball;

c) an elongated guide post member having upper and lower opposing ends, wherein said lower end of said guide post member is disposed on said top of said trailer hitch socket;

d) a cap disposed on said upper end of said guide post member to permit the driver to see the location of the trailer hitch socket;

e) an elongated receiver member having upper and lower opposing ends, wherein said lower end of said receiver member is disposed on said surface on said rear end of said vehicle;

f) a Y-shaped element disposed on said upper end of said receiver member, wherein said Y-shaped element has a leg, a pair of arms and a base disposed between said pair of arms, wherein said cap is placed in said base of said Y-shaped element during the procedure of attaching the trailer to the vehicle to permit the driver to more easily align the trailer hitch ball with the trailer hitch socket;

g) a magnet being disposed on said lower end of said guide post member for attaching said guide post member to said top of said trailer hitch socket; and, h) a plurality of spaced apart downwardly extending legs being disposed on said lower end of said guide post member, said legs having a lower end, said lower ends making contact with said top of said trailer hitch socket, said lower end of each said leg having a recess therein.

2. The alignment guide of claim 1, further comprising a magnet being disposed in each said recess in eash said leg to permit the guide post member to be attached to the top of the trailer hitch socket.

3. The alignment guide of claim 2, wherein said legs of said guide post member are spaced apart a distance great enough to receive said top of said trailer hitch socket thereinbetween to permit the guide post member to be secured to the top of the trailer hitch socket.

4. The alignment guide of claim 3, wherein said guide post member comprises a plurality of telescoping sections to permit the alignment guide to be used with various trailers.

5. The alignment guide claim 4, further comprising a magnet being disposed on said lower end of said receiver member for attaching said receiver member to said surface on said rear of said vehicle.

6. The alignment guide of claim 5, wherein said lower end of said receiver member is pivotally attached to said magnet for pivoting said receiver member in the vertical plane to permit the alignment guide to be used with various vehicles.

7. The alignment guide of claim 6, wherein said leg of said Y-shaped element is pivotally attached to said upper end of said receiver member for pivoting said Y-shaped element in the vertical plane to permit the alignment guide to be used with various vehicles.

8. The alignment guide of claim 7, wherein said receiver member comprises a plurality of telescoping sections to permit the alignment guide to be used with various vehicles.

9. The alignment guide of claim 8, wherein said Y-shaped element is movable in both the vertical and horizontal planes by manipulating said telescoping sections simultaneously with said upper and lower pivotal attachments on said receiver member to permit the alignment guide to be used with various vehicles and trailers.

10. The alignment guide of claim 9, wherein said upper and lower pivotal attachments comprises a threaded fastener, wherein a mating threaded wing nut is used in cooperation with said threaded fastener for frictionally pivoting said pivotal attachments to permit the receiver member and the Y-shaped member to be easily pivoted.

11. The alignment guide of claim 10, further comprising means for phosphorescence being disposed on said Y-shaped member to permit the alignment guide to be used during darkness.

12. The alignment guide of claim 11, further comprising means for phosphorescence being disposed on said cap to permit the alignment guide to be used during darkness.

13. The alignment guide of claim 12, further comprising a light emitting diode being disposed on said Y-shaped member to permit the alignment guide to be used during darkness.

14. The alignment guide of claim 13, further comprising a light emitting diode being disposed on said cap to permit the alignment guide to be used during darkess.

\* \* \* \* \*